(12) United States Patent
Suzuki et al.

(10) Patent No.: US 7,151,850 B2
(45) Date of Patent: Dec. 19, 2006

(54) APPARATUS AND METHOD FOR SETTING TEACHING DATA, TEACHING DATA PROVIDING SYSTEM OVER NETWORK

(75) Inventors: Noriyuki Suzuki, Kakegawa (JP); Hiroaki Fujiwara, Takatsuki (JP); Masashi Yokomori, Hirakata (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 730 days.

(21) Appl. No.: 10/281,969

(22) Filed: Oct. 29, 2002

(65) Prior Publication Data
US 2003/0082503 A1 May 1, 2003

(30) Foreign Application Priority Data
Oct. 30, 2001 (JP) .............................. 2001-333111

(51) Int. Cl.
*G06K 9/62* (2006.01)
*G06K 9/00* (2006.01)

(52) U.S. Cl. ........................................ 382/155; 382/145
(58) Field of Classification Search ................. 382/155
See application file for complete search history.

(56) References Cited

U.S. PATENT DOCUMENTS

| | | | | |
|---|---|---|---|---|
| 4,589,140 A | * | 5/1986 | Bishop et al. | ............... 382/148 |
| 5,493,594 A | * | 2/1996 | Hamada et al. | ................ 378/34 |
| 5,561,696 A | * | 10/1996 | Adams et al. | ................. 378/58 |
| 5,566,247 A | | 10/1996 | Watanabe et al. | |
| 5,568,564 A | * | 10/1996 | Ozaki | .......................... 382/149 |
| 5,822,449 A | * | 10/1998 | Kobayashi et al. | .......... 382/141 |
| 6,621,566 B1 | * | 9/2003 | Aldrich et al. | ............ 356/237.1 |

FOREIGN PATENT DOCUMENTS

| | | |
|---|---|---|
| JP | 11-258176 | 9/1999 |
| JP | 2000-332500 | 11/2000 |

* cited by examiner

*Primary Examiner*—Joseph Mancuso
*Assistant Examiner*—Damon M Conover
(74) *Attorney, Agent, or Firm*—Wenderoth, Lind & Ponack, L.L.P.

(57) ABSTRACT

Teaching data setting apparatus and a method for image processing are provided to enable setting optimum teaching data to achieve reduction in errors and error detection in the image processing. A subject teaching data generating section 1 uses databases of subject attributes and recognition operation conditions for a plurality of pieces of teaching data representing all possible combinations of the subject attributes and the recognition operation conditions. A teaching data candidate selecting section 2 selects, from the generated plurality of pieces of teaching data, teaching data candidates related to a subject to be mounted and a mounting machine for use. A subject image input section 3 is supplied with a simple subject image representing only the subject. An evaluation image generating section 4 generates predetermined evaluation images by using the simple subject image. A teaching data determining section 5 is supplied with the teaching data candidates and the evaluation images to compare and study both of them, and then determines a piece of teaching data as the optimum teaching data for the subject for output.

17 Claims, 6 Drawing Sheets

FIG. 2

SUBJECT ATTRIBUTE DATA

| COMPONENT CATEGORY | COMPONENT OUTER DIMENSION (mm) | THE NUMBER OF ELECTRODES | ELECTRODE WIDTH | ... |
|---|---|---|---|---|
| SOP | 8.0×8.0×2.0 | 4 | 1.0 | ... |
| | | | 1.25 | ... |
| | | 6 | 1.0 | ... |
| | | | 1.25 | ... |
| | 10.0×15.0×3.0 | 6 | 1.0 | ... |
| | | | 1.25 | ... |
| | | 8 | 1.0 | ... |
| | | | 1.25 | ... |
| | | 10 | 1.0 | ... |
| | | | 1.25 | ... |
| | 16.0×32.0×4.0 | 20 | 1.0 | ... |
| | | | 1.25 | ... |
| | | 24 | 1.0 | ... |
| | | | 1.25 | ... |
| | | 28 | 1.0 | ... |
| | | | 1.25 | ... |
| | ⋮ | ⋮ | ⋮ | |
| SQUARE CHIP | 0.6×0.3×0.3 | 2 | 0.1 | ... |
| | 0.6×0.3×0.35 | 2 | 0.1 | ... |
| | 1.0×0.5×0.35 | 2 | 0.2 | ... |
| | 1.6×0.8×0.5 | 2 | 0.5 | ... |
| | ⋮ | ⋮ | ⋮ | |
| BGA | 15.0×15.0×3.5 | 12 | 1.0 | ... |
| | ⋮ | ⋮ | ⋮ | ... |

FIG. 3

RECOGNITION OPERATION CONDITION DATA

| MACHINE CATEGORY | | CAMERA POSITION | | LIGHTING (HIGH/MIDDLE /LOW) | | RECOGNITION ALGORITHM | ... |
|---|---|---|---|---|---|---|---|
| HIGH-SPEED MACHINE A | | HIGH | | ON-ON-ON | | 1 | ... |
| | | | | | | ⋮ | ... |
| | | | | | | 100 | ... |
| | | | | ON-ON-OFF | | 1 | ... |
| | | | | | | ⋮ | ... |
| | | | | | | 100 | ... |
| | | | | ON-OFF-ON | | 1 | ... |
| | | | | | | ⋮ | ... |
| | | | | | | 100 | ... |
| | | | | OFF-ON-ON | | 1 | ... |
| | | | | | | ⋮ | ... |
| | | | | | | 100 | ... |
| | | | | ON-OFF-OFF | | 1 | ... |
| | | | | | | ⋮ | ... |
| | | | | | | 100 | ... |
| | | | | OFF-ON-OFF | | 1 | ... |
| | | | | | | ⋮ | ... |
| | | | | | | 100 | ... |
| | | | | ⋮ | | ⋮ | ... |
| | | LOW | | ON-ON-ON | | 1 | ... |
| | | | | ⋮ | | ⋮ | ... |
| | | DIAGONAL | | ON-ON-ON | | 1 | ... |
| | | | | ⋮ | | ⋮ | ... |
| HIGH-SPEED MACHINE B | | HIGH | | ON-ON-ON | | 1 | ... |
| | | | | | | ⋮ | ... |
| | | | | | | 200 | ... |
| ⋮ | | ⋮ | | ⋮ | | ⋮ | ... | ized expected combinations of pieces of teaching data required for image processing of the subject, and other words,

APPARATUS AND METHOD FOR SETTING TEACHING DATA, TEACHING DATA PROVIDING SYSTEM OVER NETWORK

BACKGROUND OF THE INVENTION

1. Field of the Invention

The present invention relates to apparatuses and methods for setting teaching data for image processing, and systems and methods for providing the teaching data. More specifically, the present invention relates to an apparatus and a method for setting teaching data required for image processing to be carried out in a process of mounting electronics in circuit board assemblies, and a system and a method for providing the teaching data set by the apparatus over a network.

2. Description of the Background Art

In general, image processing associated with mounting electronics requires teaching data composed of a combination of component attributes and recognition operation conditions. The component attributes are parameters such as a shape of a component, the number of leads, pitches, and colors. The recognition operation conditions are parameters such as an algorithm for recognizing a positional deviation occurring when the component is sucked for mounting, a type of a camera for shooting the component, a camera position, shooting conditions (lighting, shutter speed, etc).

Conventionally, such teaching data is set as follows. FIG. 6 is a flowchart schematically showing the procedure of a conventional method of setting conventional teaching data. In FIG. 6, from combinations of parameters, an operator extracts a recognition operation condition for each component to be mounted, and sets provisional teaching data (step S41). Using the provisional teaching data, an actual machine verifies its operation (step S42). Then, if it is possible to correctly perform image recognition with an image that was shot based on the provisional teaching data (step S43), the provisional teaching data is determined as final teaching data (step S44). If it is not possible to do so, the provisional teaching data is reset, and verification is again carried out based on the reset provisional teaching data (steps S41 through S43). As such, the conventional teaching data setting method repeats a reset-and-verifying operation in steps 41 through 43 until verification poses no problem. Japanese Patent Laid-Open Publication No. 2000-332500 discloses a method of quickly and reliably setting a shooting condition related to lighting, which is one of the recognition operation conditions of the teaching data.

However, the conventional teaching data setting method has some drawbacks. For example, in the conventional method, the reset-and-verifying operation repeatedly carried out by the actual machine increases the number of entire operations required in this method. Moreover, human factors such as an operator's past experiences and know-how greatly influence the number of entire operations. For example, the actual machine for verifying the operation is set with a plurality of recognition algorithms for components to be subjected to image processing. Which recognition algorithm should be selected depends on a predetermined recommended value or the operator's past experiences. If there is a problem with the verification results from the selected recognition algorithm, the reset-and-verifying operation has to be repeated. Also, in some cases, operation verification by the actual machine based on the selected algorithm may not be sufficient enough to find a hidden problem. In such cases, the final teaching data becomes unreliable. Thus, image processing is carried out by using such unreliable teaching data, causing some errors or erroneous detection. Also, in image processing, deterioration of a machine for use in image processing (for example, wear on a tip of a suction nozzle and reduction in lighting) and random noise included in shot-image data will cause changes of the shooting condition included in the teaching data that has been set in the machine. Such changes that occurred in the machine for image processing may also cause errors or erroneous detection, because the changes have not been considered to set the teaching data.

In mounting electronics, image processing is utilized for detecting a position of an electronic component held by a mounting machine for mounting, for verifying electronic components by a verifying machine, and for other purposes. In the field of mounting electronics, components to be processed are comparatively standardized, and therefore machines for use in mounting processing are comparatively standardized. However, the number and types of components greatly vary, making the teaching data extremely complicated for each user and each type of circuit. Consequently, even the slightest error in the teaching data may cause significant errors or erroneous detection. Therefore, appropriately setting the teaching data for image processing associated with mounting electronics is highly desired. Furthermore, efficient diversion of the use of such complicated teaching data for other purposes is also desired.

Still further, even when the above-mentioned method of quickly and reliably setting a shooting condition related to lighting as the recognition operation condition is used, only part of the above-mentioned drawbacks can be solved. To set a suitable recognition algorithm, the reset-and-verifying operation still has to be repeated as with the conventional method. Also, changes of the shooting condition due to deterioration of the machine for use in image processing or random noise have not been taken into consideration to set the teaching data, leading to errors or erroneous detection.

SUMMARY OF THE INVENTION

Therefore, an object of the present invention is to provide an apparatus and a method for image processing that are capable of setting optimum teaching data to achieve reduction in error and erroneous detection in image processing without any reset-and-verifying operation by an actual machine. Also, another object of the present invention is to provide a system and a method for image processing that are capable of efficiently diverting the set optimum teaching data over a network.

The present invention has the following features to attain the objects mentioned above.

A first aspect of the present invention is directed to a teaching data setting apparatus for setting teaching data required for image processing associated with mounting electronics. The teaching data setting apparatus includes a subject teaching data generating section, a teaching data candidate selecting section, a subject image input section, an evaluation image generation section, and a teaching data determining section. The subject teaching data generating section stores in advance subject attributes related to a subject to be mounted and recognition operation conditions required for the image processing, and generates a plurality of pieces of teaching data representing all possible combinations of the subject attributes and the recognition operation conditions. The teaching data candidate selecting section selects, from the plurality of pieces of teaching data generated by the subject teaching data generating section, teaching data candidates related to the subject and amounting machine for use. The subject image input section is supplied with a simple subject image representing only the subject. The evaluation image generating section generates a predetermined evaluation image required for determining optimum teaching data for the subject by using the simple subject image supplied to the subject image input section. The teaching data determining section determines, based on the evaluation images generated by the evaluation image generating section, a piece of teaching data as the optimum teaching data for the subject out of the teaching data candidates selected by the teaching data candidate selecting section.

With the above structure, a plurality of pieces of teaching data are first narrowed down based on the subject attributes to extract teaching data candidates. Then, by using evaluation images generated from actual subject images, the teaching data candidates are evaluated. Based on the evaluation result, optimum teaching data is determined. Therefore, unlike the conventional method of repeatedly performing the reset-and-verifying operation, the optimum teaching data can be determined easily and quickly. Also, in the present embodiment, evaluation of the teaching data candidates is performed by using the evaluation images. Therefore, it is possible to verify, in advance, deterioration of the machine for actual image processing or other problems that could not have been assumed only with sample images obtained by an actual machine. With this verification, more accurate teaching data can be determined. Consequently, image processing can be performed with the optimum teaching data, and therefore errors or erroneous detection in image processing can be reduced.

Specifically, the subject may be an electronic component, and the subject attributes may include a shape of the electronic component.

Further, the evaluation image generating section may generate a plurality of the evaluation images by carrying out, onto the simple subject image supplied to the subject image input section, image processing in consideration of possible shot-image variations that will occur in the image processing associated with mounting electronics. With this, evaluation of the teaching data candidates is performed by using the evaluation images generated in consideration of the above-mentioned possible shot-image variations. Therefore, it is possible to verify, in advance, deterioration of the machine for actual image processing or other problems that could not have been assumed only with sample images obtained by an actual machine. With this verification, more accurate teaching data can be determined.

As the image processing, in consideration of possible shot-image variations, various types of processing can be considered. A first type of processing is shading processing in consideration of a possible tilt of the subject in the image processing associated with mounting electronics. In this case, it is possible to perform simulations in consideration of possible changes of light and shade on a surface of the subject as being tilted or turned. Therefore, even if the subject is tilted due to wear of a part provided on a machine for actually performing image processing to hold the subject, errors and erroneous detection in image processing can be reduced. A second type of processing is random noise processing in consideration of possible noise that will occur in an image shot by an image-shooting machine in the image processing associated with mounting electronics. In this case, it is possible to perform simulations of correct image recognition in consideration of possible overlapping of slight noises of the image shot by the image-shooting machine. Therefore, even if the image shot by the image-shooting machine provided on the machine for actually performing image processing has slight noises overlapped, errors and erroneous detection in image processing can be reduced. A third type of processing is contrast processing in consideration of possible lighting variations that will occur in the image processing associated with mounting electronics. In this case, it is possible to perform simulations with reference to possible lighting changes in consideration of changes of the state of the surface of the subject and variations of lighting intensities of the specific machine. Therefore, even if lighting of lighting equipment provided on the machine for actually performing image processing is reduced due to deterioration, errors and erroneous detection in image processing can be reduced.

Furthermore, the recognition operation conditions may include at least a recognition algorithm required for the image processing associated with mounting electronics. In this case, the teaching data determining section determines the optimum teaching data for the subject by evaluating results obtained by carrying out image recognition onto the evaluation image generated by the evaluation image generating section based on the recognition algorithm included in each of the teaching data candidates selected by the teaching data candidate selecting section. With this, the recognition algorithm included in the teaching data can be automatically evaluated. Therefore, the reset-and-verifying operation associated with the recognition algorithm is not required.

Still further, the subject image input section may be supplied with a plurality of simple subject images generated based on a recommended lighting intensity as to a lighting condition included in the recognition operation conditions and lighting levels obtained by increasing and decreasing the recommended lighting intensity within a predetermined range. In this case, the evaluation image generating section generates a plurality of evaluation images by performing image processing in consideration of possible shot-image variations that will occur in the image processing associated with mounting electronics onto the plurality of the simple subject images supplied to the subject image input section. Then, the teaching data determining section extracts evaluation images corresponding to the teaching data candidates selected by the teaching data candidate selecting section from the evaluation images generated by the evaluation image generating section. The teaching data determining section then determines the optimum teaching data for the subject by evaluating the results obtained by carrying out image recognition onto the extracted evaluation images based on the recognition algorithm included in each of the corresponding teaching data candidates. With this, appropriate evaluation images can be extracted based on the teaching data candidates selected by the teaching data selecting section. Therefore, accurate teaching data and recognition algorithm can be easily determined.

Still further, the subject teaching data generating section may generate the plurality of pieces of teaching data by deleting, from among all possible combinations of the subject attributes and the recognition operation conditions, a combination including a recognition algorithm irrelevant to the subject. Thus, the amount of teaching data stored in the subject teaching data generating section can be reduced.

A second aspect of the present invention is directed to a teaching data providing system for providing teaching data required for image processing associated with mounting electronics to one or more specific machines over a network connecting a service provider side and a service user side. In a first example of the teaching data providing system, the service provider side includes a subject teaching data generating section, a teaching data candidate selecting section, a subject image input section, an evaluation image generating section, a teaching data determining section, and a delivering section. The subject teaching data generating section stores in advance subject attributes related to a subject to be mounted and recognition operation conditions required for the image processing, and generates a plurality of pieces of teaching data representing all possible combinations of the subject attributes and the recognition operation conditions. The teaching data candidate selecting section selects, from the plurality of pieces of teaching data generated by the subject teaching data generating section, teaching data candidates related to the subject and a mounting machine for use. The subject image input section is supplied with a simple subject image representing only the subject. The evaluation image generating section generates a predetermined evaluation image required for determining optimum teaching data for the subject by using the simple subject image supplied to the subject image input section. The teaching data determining section determines, based on the evaluation image generated by the evaluation image generating section, a piece of teaching data as the optimum teaching data for the subject out of the teaching data candidates selected by the teaching data candidate selecting section. The delivering section electronically delivers the optimum teaching data determined by the teaching data determining section to the one or more specific machines. The service user side includes the one or more specific machines. The specific machines perform the image processing associated with mounting electronics by using the optimum teaching data delivered from the delivering section.

With the above structure, the service user side can advantageously dispense with the cost of installing a teaching data setting apparatus, and also can avoid the efforts needed for setting the teaching data. The service provider side, on the other hand, can provide (sell) the standardized teaching data to a plurality of users, thereby expecting an increase in business profits.

In a second example of the teaching data providing system, the service provider side includes the subject teaching data generating section, the teaching data candidate selecting section, the subject image input section, the evaluation image generating section, and the teaching data determining section. The service user side includes the delivering section and the one or more specific machines.

With the above structure, the service user side can advantageously dispense with cost of installing a teaching data setting apparatus, and also can avoid efforts for setting the teaching data. Also, the teaching data can be efficiently used among a plurality of specific machines. The service provider side, on the other hand, can provide (sell) the standardized teaching data to a plurality of users, thereby expecting an increase in business profits In a third example of the teaching data providing system, the service provider side includes the subject teaching data generating section. The service user side includes the teaching data candidate selecting section, the subject image input section, the evaluation image generating section, the teaching data determining section, the delivering section, and the one or more specific machines.

With the above structure, the service user side can advantageously dispense with management of the databases and a storage apparatus required for database management. The service provider side, on the other hand, can carry out only management of the databases.

A third aspect of the present invention is directed to a teaching data setting method for setting teaching data required for image processing associated with mounting electronics. The teaching data setting method includes a teaching data generating step, a teaching data selecting step, a subject image supplying step, an evaluation image generating step, and a teaching data determining step. In the teaching data generating step, by using subject attributes related to a subject to be mounted and recognition operation conditions required for the image processing stored in advance, a plurality of pieces of teaching data representing all possible combinations of the subject attributes and the recognition operation conditions are generated. In the teaching data selecting step, from the generated plurality of pieces of teaching data, teaching data candidates related to the subject and a mounting machine for use are selected. In the subject image supplying step, a simple subject image representing only the subject is supplied. In the evaluation image generating step, a predetermined evaluation image required for determining optimum teaching data for the subject by using the supplied simple subject image are generated. In the teaching data determining step, based on the generated evaluation image, a piece of teaching data as the optimum teaching data for the subject out of the selected teaching data candidates is determined.

The recognition operation conditions may include at least a recognition algorithm required for the image processing associated with mounting electronics. Furthermore, the image supplying step may supply a plurality of simple subject images generated based on a recommended lighting intensity as to a lighting condition included in the recognition operation conditions and lighting levels obtained by increasing and decreasing the recommended lighting intensity within a predetermined range. In this case, the evaluation image generating step generates a plurality of evaluation images by performing image processing in consideration of possible shot-image variations that will occur in the image processing associated with mounting electronics onto the plurality of simple subject images supplied in the subject image supplying step. The teaching data determining step extracts evaluation images corresponding to the teaching data candidates selected in the teaching data candidate selecting step from the evaluation images generated in the evaluation image generating step. Then, the teaching data determining step determines the optimum teaching data for the subject by evaluating the results obtained by carrying out image recognition onto the extracted evaluation images based on the recognition algorithm included in each of the corresponding teaching data candidates.

Furthermore, in a first example of the teaching data setting method, when the teaching data required for the image processing associated with mounting electronics is provided to one or more specific machines over a network connecting a service provider side and a service user side, the teaching data generating step, the teaching data candidate selecting step, the evaluation image generating step, the image supplying step, and the teaching data determining step are carried out by the service provider side. In this case, the method further includes a step, to be carried out by the service provider side, of electronically delivering the teaching data determined in the teaching data determining step to the one or more specific machines. Also, the method further includes a step, to be carried out by the one or more specific machines included in the service user side, of performing the image processing associated with mounting electronics by using the optimum teaching data delivered by the service provider side.

In a second example of the teaching data setting method, the teaching data generating step, the teaching data candidate selecting step, the evaluation image generating step, the image supplying step, and the teaching data determining step are carried out by the service provider side. In this case, the electronic delivering step and the image processing performing step are carried out by the service user side.

In a third example of the teaching data setting method, the teaching data generating step is carried out by the service provider side. In this case, the teaching data candidate selecting step, the evaluation image generating step, the image supplying step, the teaching data determining step, the electronic delivering step, and the image processing performing step are carried out by the service user side.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a table showing part of a database of subject attribute data stored in a teaching data generating section 1 of FIG. 1;

FIG. 3 is a table showing part of a database of recognition operation condition data stored in the teaching data generating section 1 of FIG. 1;

DESCRIPTION OF THE PREFERRED EMBODIMENT (Apparatus and Method for Setting Teaching Data)

Figure 1:
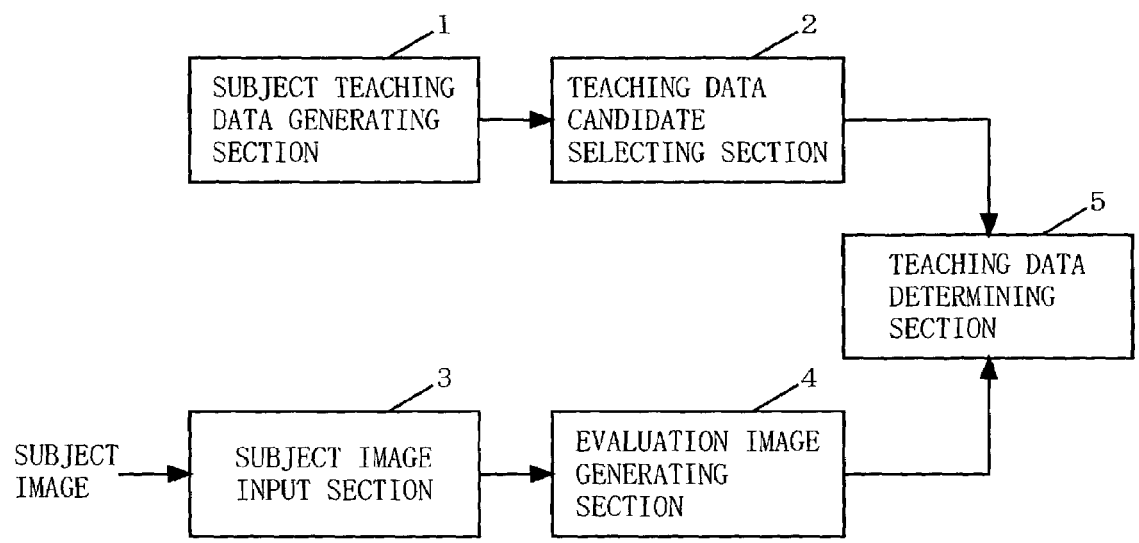
FIG. 1 is a block diagram illustrating the construction of a teaching data setting apparatus for image processing according to one embodiment of the present invention.

FIG. 1 is a block diagram illustrating the construction of a teaching data setting apparatus for image processing according to one embodiment of the present invention. In FIG. 1, the teaching data setting apparatus for image processing in the present invention includes a subject teaching data generating section 1, a teaching data candidate selecting section 2, a subject image input section 3, an evaluation image generating section 4, and a teaching data determining section 5. The operation of the above-constructed teaching data setting apparatus for image processing and the method of setting teaching data for image processing are described below.

As prerequisites, the subject teaching data generating section 1 stores in advance, as databases, subject attribute data for subjects such as electronic components, and recognition operation condition data required for image processing, independently. With reference to FIGS. 2 and 3, the subject attribute data and the recognition operation condition data are described below in a case where subjects to be processed are electronic components. FIG. 2 is a table showing part of the database of the subject attribute data stored in the subject teaching data generating section 1. FIG. 3 is a table showing part of the database of the recognition operation condition data stored in the subject teaching data generating section 1.

In FIG. 2, the subject attribute data includes parameters such as component category, component outer dimension, the number and shapes of electrodes (leads), polarity marking position, component body color, etc. For example, the component category indicates a type of component (subject) to be processed such as a square chip, an aluminum electrolytic capacitor, a QFP (Quad Flat Package)/SOP (Small Outline Package), or a BGA (Ball Grid Array). The component outer dimension indicates dimensional data of the component, such as the length, width, height, and the like. This subject attribute data database may be constructed by inputting already-existing CAD data, or by using results obtained by actually measuring the attributes of the subject by a camera, a scanner, a laser scanner, or the like. Also, each piece of subject attribute data is structured by combining the parameter of the component type with its corresponding parameters. For example, with reference to the table of FIG. 2, one piece of subject attribute data is a combination of "SOP; 8.0 ×8.0×2.0; 4; 1.0; . . . ", as shown on the first line in the table, and another piece of subject attribute data is a combination of "SOP; 8.0×8.0×2.0; 4; 1.25; . . . ", as shown on the second line in the table.

In FIG. 3, the recognition operation condition data includes parameters such as machine type, camera position and camera type, shooting conditions (lighting and shutter speed, for example), and a number indicating a recognition algorithm for recognizing a deviation from a position where the component should be sucked. For example, the machine type indicates a component mounting machine for image processing such as a high-speed machine A, a high-speed machine B, or a multi-functional machine C, or a specific machine such as a verifying machine. The camera type indicates, for example, a two-dimensional camera or a three-dimensional camera. The camera position indicates, for example, a position of the camera with respect to the subject, such as a high position, a low position, and a diagonal position. The lighting conditions indicate a position of lighting equipment, such as a high position, a middle position, or a low position; lighting ON or OFF; the intensity of lighting; etc. As with the above-described subject attribute data, each piece of recognition operation condition data is constructed by combining the parameter of the specific machine with its corresponding parameters. For example, with reference to the table of FIG. 3, one piece of recognition operation condition data is a combination of "high-speed machine A; HIGH; ON-ON-ON; 1; . . . ", as shown on the first line in the table. Note that the subject attribute data and the recognition operation data may indicate two-dimensional features or three-dimensional features.

Using these databases, the subject teaching data generating section 1 generates a plurality of pieces of teaching data by making all possible combinations of the subject attribute data and the recognition operation condition data. For example, 1,000 pieces of subject attribution data and 3,000 pieces of recognition operation condition data make 3,000,000 combinations of teaching data. Note that, for making all possible combinations, recognition operation condition data irrelevant to the subject attribute data to be combined with it may be excluded in advance. For example, recognition operation condition data including a recognition algorithm irrelevant to a component type indicated by the subject attribute data to be combined with it is excluded in advance.

With such exclusion, the amount of teaching data stored in the subject teaching data generating section 1 can be reduced.

From the plurality of pieces of teaching data generated by the subject teaching data generating section 1, the teaching data candidate selecting section 2 selects teaching data candidates related to a subject to be actually processed and a specific machine such as a mounting machine or a verifying machine. The subject and the specific machine are designated by inputs from the operator, for example. Such inputs include various parameters of the subject attributes and the machine type, camera type, and camera position of the recognition operation conditions. First, from the plurality of pieces of teaching data, the teaching data candidate selecting section 2 selects teaching data candidates corresponding to the various input parameters of the subject attributes. With this, teaching data irrelevant to the subject to be processed is excluded. When an acceptable range is designated (when an acceptable range of the component outer dimension is designated, for example), teaching data candidates corresponding to plurality of pieces of subject attribute data that fall within the acceptable range are selected. The teaching data candidate selecting section 2 then further selects, from the already-selected teaching data candidates, teaching data candidates corresponding to the input parameters of the recognition operation conditions, that is, the machine type, camera type, and camera position. With this, teaching data irrelevant to the designated machine type, camera type, and camera position is excluded. For example, when a subject attribute A is designated, only pieces of teaching data (1,500 pieces, for example) related to the subject attribute A are selected from the above-mentioned 3,000,000 pieces of teaching data. Then, when a recognition operation condition B is designated, only pieces of teaching data (500 pieces, for example) related to the recognition operation condition B are selected from the 1,500 pieces of teaching data.

The subject image input section 3 is supplied with images of the subject to be processed by the specific machine (the images are hereinafter referred to reference images). The reference images may be those shot by a camera, or may be supplied by reading an existing image file. The reference images should be in accordance with the recognition operation conditions supplied to the teaching data candidate selecting section 2, that is, the machine type, camera type, and camera position, and also in consideration of recommended lighting conditions. For example, when the machine type for generating a reference image is a high-speed machine A and three pieces of light equipment are respectively provided at higher, middle, and lower positions, the reference images are generated in accordance with the camera type and the position of the high-speed machine A, and with a lighting intensity of each piece of lighting equipment set within a predetermined range with respect to a recommended intensity for each piece of lighting equipment. When each lighting intensity is increased and decreased within a ±1 level with respect to each recommended intensity, three combinations are generated for the lighting intensity of each piece of lighting equipment. Consequently, 27 (3×3×3) reference images are generated.

The evaluation image generating section 4 uses the reference images supplied to the subject image input section 3 to generate evaluation images required for enabling the teaching data determining section 5 to determine final teaching data. The evaluation images are generated through processing such as subjecting the above-mentioned reference images to artificial shading processing, adding random noise to the reference images, or changing contrast of the reference images. Each processing produces a plurality of evaluation images. Shading processing is to enable simulations in consideration of possible changes of light and shade on a surface of the subject when sucked (by a nozzle of a mounting machine) as being tilted or turned. Random noise addition is to enable simulations of correct image recognition in consideration of possible overlapping of slight noises of the camera-shot images. Contrast changing is to enable simulations with reference to possible lighting changes in consideration of changes of the state of the surface of the subject and variations of lighting intensities of the specific machine. That is, the evaluation image generating section 4 generates evaluation images for each predetermined stage corresponding to each possible shot-image variation (for example, wear on a tip of a suction nozzle, deterioration of the machine such as reduction in lighting, and a change of image data due to random noise on the images). For example, when 27 reference images are generated and each processing as mentioned above includes five stages, 405 (27×5×3) evaluation images are generated.

The teaching data determining section 5 is supplied with the teaching data candidates selected by the teaching data candidate selecting section 2 and the evaluation images generated by the evaluation image generating section 4. The teaching data determining section 5 then extracts evaluation images in accordance with the respective teaching data candidates. Specifically, the teaching data determining section 5 extracts evaluation images in accordance with the lighting conditions (position and intensity of each pieces of light equipment) set in the teaching data candidates. Here, as described above, since the evaluation images have been generated based on predetermined stages corresponding to possible shot-image variations for each lighting condition, a plurality of evaluation images in consideration of possible shot-image variations are extracted for each teaching data candidate. When there are no evaluation images corresponding to a teaching data candidate, this teaching data candidate is excluded. For example, the teaching data determining section 5 excludes a teaching data candidate having a lighting condition whose lighting intensity greatly differs from the above-state lighting recommended intensity, because no evaluation images have been generated for this teaching data candidate.

The teaching data determining section 5 compares and studies the extracted evaluation images for each teaching data candidate. Evaluation items for comparison and study include positional deviation in image recognition with respect to a predetermined position of the subject. The teaching data determining section 5 performs image recognition of the evaluation images selected based on the teaching data candidates by using the recognition algorithms set in the teaching data candidates. By way of example only, evaluation is performed for each teaching data candidate as to how the predetermined position (for example, an intermediate point of an edge portion of a lead) on each reference image supplied to the subject image input section 3 is recognized on each evaluation image. Here, since the evaluation images extracted for each teaching data candidate have been generated based on the predetermined stages corresponding to possible shot-image variations, a plurality of evaluation images have been generated for each teaching data candidate. Therefore, the teaching data determining section 5 obtains a plurality of results of positional recognition for each teaching data candidate. The teaching data determining section 5 then evaluates the positional recognition results in view of an average amount of deviation with respect to the predetermined position, variations (standard deviation), positional recognition error rate, or the like, and compares the evaluated results to extract a teaching data candidate showing the most accurate positional recognition result.

As described above, according to the apparatus and method for setting teaching data for image processing in the embodiment of the present invention, a plurality of pieces of teaching data are first narrowed down based on the subject attributes to extract teaching data candidates. Then, by using evaluation images generated from actual subject images, the teaching data candidates are evaluated. Based on the evaluation results, teaching data including an optimum recognition algorithm is determined. Therefore, unlike the conventional method of repeatedly performing the reset-and-verifying operation, the optimum teaching data can be determined easily and quickly. Also, in the present embodiment, evaluation of the teaching data candidates is performed by using the evaluation images generated in consideration of the above-mentioned possible shot-image variations. Therefore, it is possible to verify, in advance, deterioration of the machine for actual image processing or other problems that could not have been assumed only with sample images obtained by an actual machine. With this verification, more accurate teaching data can be determined. Consequently, image processing can be performed with the optimum teaching data, and therefore errors or erroneous detection in image processing can be reduced.

(System Using the Teaching Data Setting Apparatus)

Figure 4:
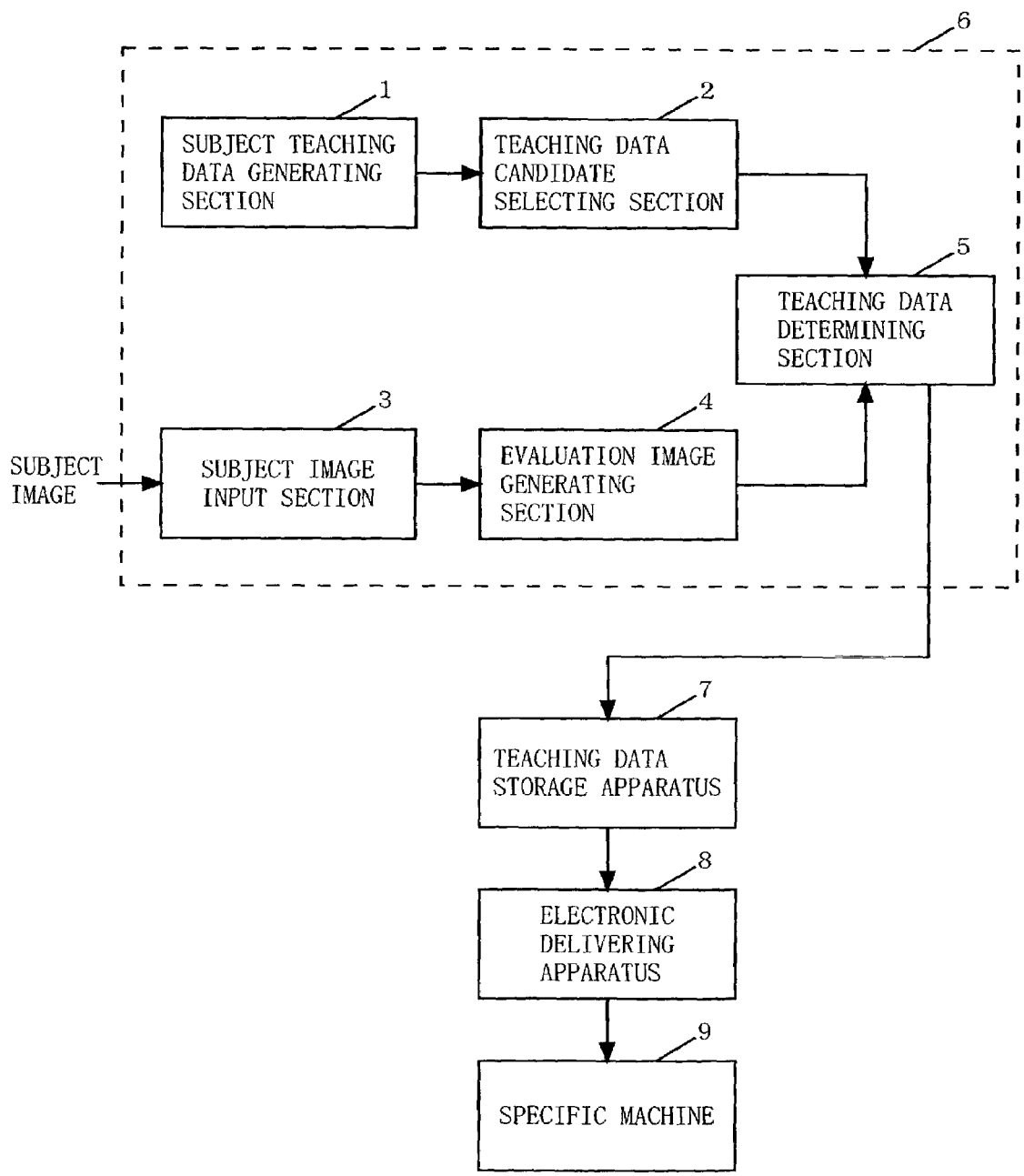
FIG. 4 is a block diagram illustrating an exemplary configuration of a system using the teaching data setting apparatus for image processing according to the embodiment of the present invention.

FIG. 4 is a block diagram illustrating an exemplary configuration of a system using the teaching data setting apparatus for image processing according to the embodiment of the present invention. In FIG. 4, the system includes a teaching data setting apparatus 6 for image processing, a teaching data storage apparatus 7, an electronic delivering apparatus 8, and a specific machine 9. As described above, the teaching data setting apparatus 6 includes the subject teaching data generating section 1, the teaching data candidate selecting section 2, the subject image input section 3, the evaluation image generating section 4, and the teaching data determining section 5. The above-configured system, mainly with respect to portions other than the above-described teaching data setting apparatus, is described below.

The teaching data storage apparatus 7 stores, for each subject, optimum teaching data determined by the teaching data determining section 5 of the teaching data setting apparatus 6. The stored optimum teaching data is delivered as required to the specific machine 9 through the electronic delivering apparatus 8 capable of data transmission over a LAN (Local Area Network) or the like. The specific machine 9 is, for example, an electronics mounting machine capable of image processing, a component verifying machine, or the like. The specific machine 9 may be a machine dedicated to image processing. The specific machine 9 uses the delivered teaching data to perform relevant image processing, thereby improving manufacturing efficiency in mounting electronics.

As described above, the teaching data setting apparatus 6 for image processing can be placed at a location different from a location where image processing is actually performed. Therefore, flexible system configuration can be achieved. Also, the teaching data is delivered to the specific machine 9 through the electronic delivering apparatus 8. Therefore, the teaching data can be shared by a plurality of specific machines 9, thereby achieving efficient use of the teaching data.

(Other Systems Using a Network)

In the foregoing description, a system configuration in a limited network area (through an in-factory LAN, for example) has been exemplarily described. Other than that, various system configurations can be achieved in a larger network area (through the Internet, for example). Exemplary system configurations are described below.

Figure 5:
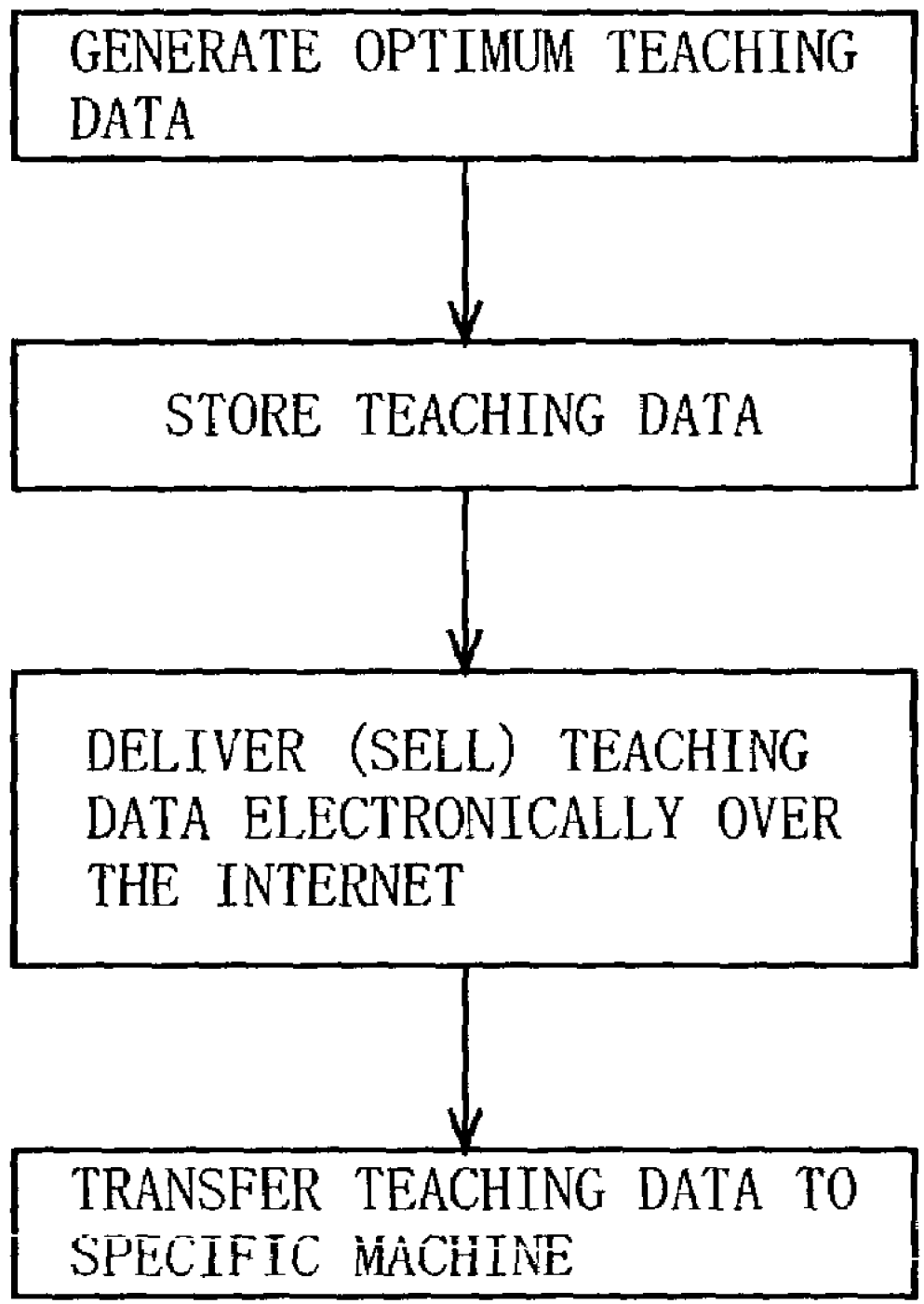
FIG. 5 is a flowchart showing the procedure when a network is used in the system illustrated in FIG. 4.
Figure 6:
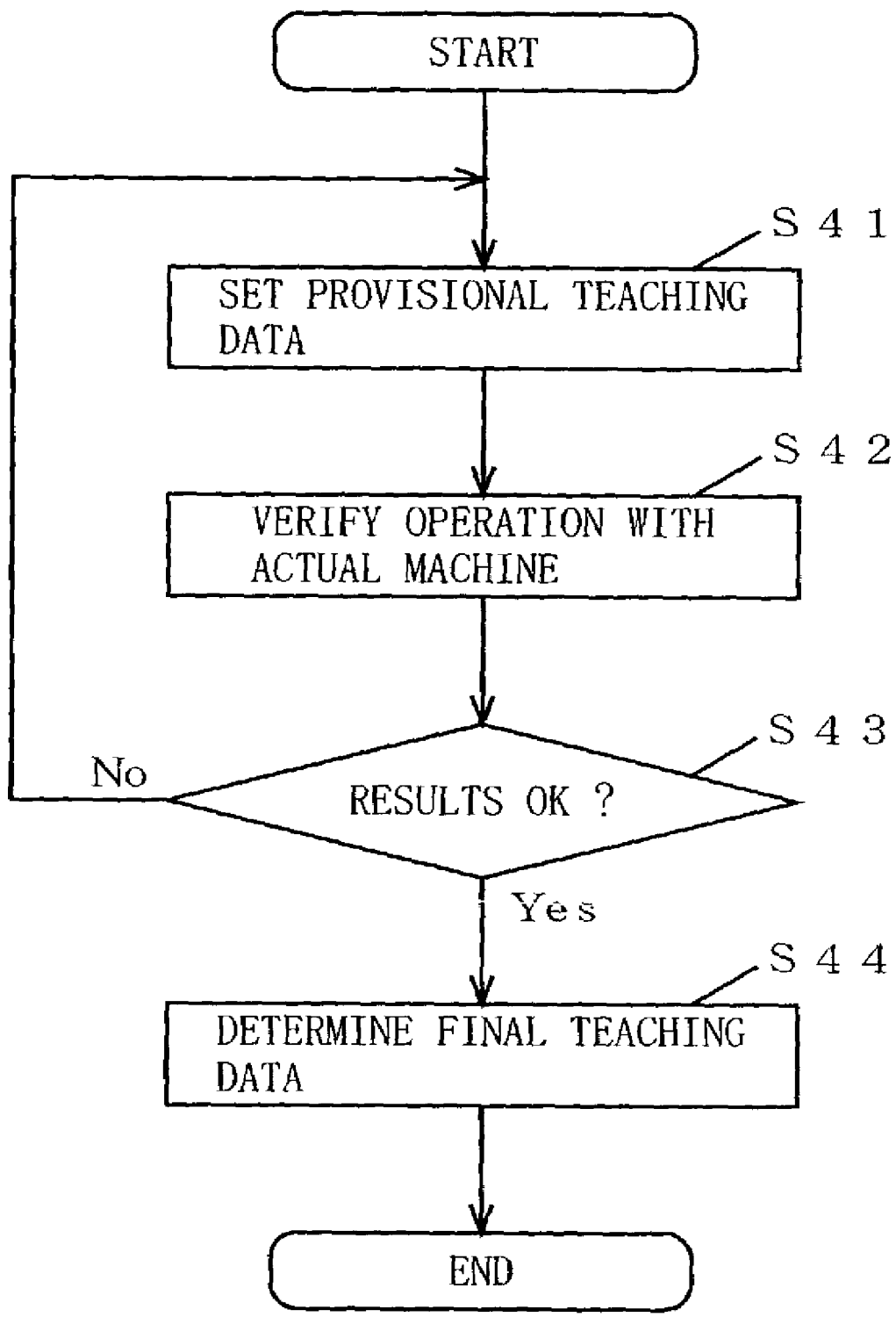
FIG. 6 is a flowchart schematically showing the procedure of a conventional teaching data setting method.

1. A system where the electronic delivering apparatus 8 and the specific machine 9 are coupled through the Internet In this system, the teaching data setting apparatus 6 for image processing, the teaching data storage apparatus 7, and the electronic delivering apparatus 8 are constructed at a service provider side such as a company manufacturing the specific machine 9 or a third-party service provider managing the generated teaching data. Therefore, a service user side, such as a user who possesses the specific machine 9, requests the service provider side for the teaching data, as required or automatically at predetermined time intervals, to obtain or purchase the teaching data. With such a system configuration, the service user side can advantageously dispense with the cost of installing the teaching data setting apparatus 6, and also can avoid the efforts needed for setting the teaching data. The service provider side, on the other hand, can provide (sell) the standardized teaching data to a plurality of users, thereby expecting an increase in business profits. FIG. 5 illustrates the procedure to be carried out in this system.

2. A system where teaching data setting apparatus 6 and the teaching data storage apparatus 7 are coupled through the Internet In this system, the teaching data setting apparatus 6 for image processing is constructed at the service provider side to manage the generated teaching data. Therefore, the service user side requests the service provider side for the teaching data, as required or automatically at predetermined time intervals, to obtain or purchase the teaching data. With such a system configuration, the service user side can advantageously dispense with the cost of installing the teaching data setting apparatus 6, and also can avoid the efforts needed for setting the teaching data. Also, the teaching data obtained from the service provider side can be stored in the teaching data storage apparatus 7, thereby efficiently using the teaching data among a plurality of specific machines 9. The service provider side, on the other hand, can provide (sell) the standardized teaching data to a plurality of users, thereby expecting an increase in business profits.

3. A system where the subject teaching data generating section 1 and the teaching data candidate extracting section 2 are coupled through the Internet In this system, only the subject teaching data extracting section 1 in the teaching data setting apparatus 6 for image processing is constructed at the service provider side to manage the databases of the subject attributes and the recognition operation conditions. Therefore, the service user side requests the service provider side for the teaching data, as required or automatically at predetermined time intervals, to obtain or purchase the teaching data. With such a system configuration, the service user side can advantageously dispense with management of the databases and a storage apparatus required for database management. The service provider side, on the other hand, can carry out only management of the databases. As such, various Internet businesses can be developed.

While the invention has been described in detail, the foregoing description is in all aspects illustrative and not restrictive. It is understood that numerous other modifications and variations can be devised without departing from the scope of the invention.

What is claimed is:

1. A teaching data setting apparatus for setting teaching data required for image processing associated with mounting electronics, comprising:
    a subject teaching data generating section operable to store in advance subject attributes related to a subject to be mounted and recognition operation conditions required for the image processing, and operable to generate a plurality of pieces of teaching data representing all possible combinations of the subject attributes and the recognition operation conditions;
    a teaching data candidate selecting section operable to select, from the plurality of pieces of teaching data generated by the subject teaching data generating section, teaching data candidates related to the subject and a mounting machine for use;
    a subject image input section operable to be supplied with a simple subject image representing only the subject;
    an evaluation image generating section operable to generate a plurality of predetermined evaluation images required for determining optimum teaching data for the subject by using one simple subject image supplied to the subject image input section; and
    a teaching data determining section operable to determine, based on the plurality of evaluation images generated by the evaluation image generating section, a piece of teaching data as the optimum teaching data for the subject out of the teaching data candidates selected by the teaching data candidate selecting section.

2. The teaching data setting apparatus according to claim 1, wherein
    the subject is an electronic component, and the subject attributes include a shape of the electronic component.

3. The teaching data setting apparatus according to claim 1, wherein
    the evaluation image generating section is operable to generate the plurality of said evaluation images by carrying out, for the simple subject image supplied to the subject image input section, image processing in consideration of possible shot-image variations that will occur in the image processing associated with mounting electronics.

4. The teaching data setting apparatus according to claim 3, wherein
    the image processing, in consideration of possible shot-image variations carried out by the evaluation image generating section, includes at least shading processing in consideration of a possible tilt of the subject in the image processing associated with mounting electronics.

5. The teaching data setting apparatus according to claim 3, wherein
    the image processing, in consideration of possible shot-image variations carried out by the evaluation image generating section, includes at least random noise processing in consideration of possible noise that will occur in an image shot by an image-shooting machine in the image processing associated with mounting electronics.

6. The teaching data setting apparatus according to claim 3, wherein
    the image processing, in consideration of possible shot-image variations carried out by the evaluation image generating section, includes at least contrast processing in consideration of possible lighting variations that will occur in the image processing associated with mounting electronics.

7. The teaching data setting apparatus according to claim 1, wherein
    the recognition operation conditions include at least a recognition algorithm required for the image processing associated with mounting electronics,
    the teaching data determining section is operable to determine the optimum teaching data for the subject by evaluating results obtained by carrying out image recognition onto the evaluation images generated by the evaluation image generating section based on the recognition algorithm included in each of the teaching data candidates selected by the teaching data candidate selecting section.

8. The teaching data setting apparatus according to claim 7, wherein
    the subject image input section is supplied with a plurality of simple subject images generated based on a recommended lighting intensity as to a lighting condition included in the recognition operation conditions and lighting levels obtained by increasing and decreasing the recommended lighting intensity within a predetermined range,
    the evaluation image generating section is operable to generate the plurality of said evaluation images by performing image processing in consideration of possible shot-image variations that will occur in the image processing associated with mounting electronics onto the plurality of simple subject images supplied to the subject image input section, and
    the teaching data determining section is operable to
        extract evaluation images corresponding to the teaching data candidates selected by the teaching data candidate selecting section from the evaluation images generated by the evaluation image generating section, and
        determine the optimum teaching data for the subject by evaluating the results obtained by carrying out image recognition onto the extracted evaluation images based on the recognition algorithm included in each of the corresponding teaching data candidates.

9. The teaching data setting apparatus according to claim 1, wherein
    the recognition operation conditions include at least a recognition algorithm required for the image processing associated with mounting electronics,
    the subject teaching data generating section is operable to generate the plurality of pieces of teaching data by deleting, from among all possible combinations of the subject attributes and the recognition operation conditions, a combination including a recognition algorithm irrelevant to the subject.

10. A teaching data providing system for providing teaching data required for image processing associated with mounting electronics to one or more specific machines over a network connecting a service provider side and a service user side,
    the service provider side comprising:
        a subject teaching data generating section operable to store in advance subject attributes related to a subject to be mounted and recognition operation conditions required for the image processing, and operable to generate a plurality of pieces of teaching data representing all possible combinations of the subject attributes and the recognition operation conditions;

a teaching data candidate selecting section operable to select, from the plurality of pieces of teaching data generated by the subject teaching data generating section, teaching data candidates related to the subject and a mounting machine for use;

a subject image input section operable to be supplied with a simple subject image representing only the subject;

an evaluation image generating section operable to generate a plurality of predetermined evaluation images required for determining optimum teaching data for the subject by using one simple subject image supplied to the subject image input section;

a teaching data determining section operable to determine, based on the plurality of evaluation images generated by the evaluation image generating section, a piece of teaching data as the optimum teaching data for the subject out of the teaching data candidates selected by the teaching data candidate selecting section; and a delivering section operable to electronically deliver the optimum teaching data determined by the teaching data determining section to the one or more specific machines, wherein the service user side comprises the one or more specific machines that perform the image processing associated with mounting electronics by using the optimum teaching data delivered from the delivering section.

11. A teaching data providing system for providing teaching data required for image processing associated with mounting electronics to one or more specific machines over a network connecting a service provider side and a service user side, the service provider side comprising:
a subject teaching data generating section operable to store in advance subject attributes related to a subject to be mounted and recognition operation conditions required for the image processing, and operable to generate a plurality of pieces of teaching data representing all possible combinations of the subject attributes and the recognition operation conditions;

a teaching data candidate selecting section operable to select, from the plurality of pieces of teaching data generated by the subject teaching data generating section, teaching data candidates related to the subject and a mounting machine for use;

a subject image input section operable to be supplied with a simple subject image representing only the subject;

an evaluation image generating section operable to generate a plurality of predetermined evaluation images required for determining optimum teaching data for the subject by using one simple subject image supplied to the subject image input section; and a teaching data determining section operable to determine, based on the plurality of evaluation images generated by the evaluation image generating section, a piece of teaching data as the optimum teaching data for the subject out of the teaching data candidates selected by the teaching data candidate selecting section, and the service user side comprising:
a delivering section operable to obtain the optimum teaching data determined by the teaching data determining section, and electronically deliver the optimum teaching data determined by the teaching data determining section to the one or more specific machines; and the one or more specific machines operable to perform the image processing associated with mounting electronics by using the optimum teaching data delivered from the delivering section.

12. A teaching data providing system for providing teaching data required for image processing associated with mounting electronics to one or more specific machines over a network connecting a service provider side and a service user side, the service provider side comprising
a subject teaching data generating section operable to store in advance subject attributes related to a subject to be mounted and recognition operation conditions required for the image processing, and operable to generate a plurality of pieces of teaching data representing all possible combinations of the subject attributes and the recognition operation conditions, and the service user side comprising:
a teaching data candidate selecting section operable to obtain the plurality of pieces of teaching data generated by the subject teaching data generating section, and selects, from the plurality of pieces of teaching data, teaching data candidates related to the subject and a mounting machine for use;

a subject image input section operable to be supplied with a simple subject image representing only the subject;

an evaluation image generating section operable to generate a plurality of predetermined evaluation images required for determining optimum teaching data for the subject by using one simple subject image supplied to the subject image input section;

a teaching data determining section operable to determine, based on the plurality of evaluation images generated by the evaluation image generating section, a piece of teaching data as the optimum teaching data for the subject out of the teaching data candidates selected by the teaching data candidate selecting section;

a delivering section operable to obtain the optimum teaching data determined by the teaching data determining section, and electronically deliver the optimum teaching data determined by the teaching data determining section to the one or more specific machines; and the one or more specific machines operable to perform the image processing associated with mounting electronics by using the optimum teaching data delivered from the delivering section.

13. A teaching data setting method for setting optimum teaching data required for image processing associated with mounting electronics, comprising:

generating, by using subject attributes related to a subject to be mounted and recognition operation conditions required for the image processing stored in advance, a plurality of pieces of teaching data representing all possible combinations of the subject attributes and the recognition operation conditions;

selecting, from the generated plurality of pieces of teaching data, teaching data candidates related to the subject and a mounting machine for use;

supplying a simple subject image representing only the subject;

generating a plurality of predetermined evaluation images required for determining optimum teaching data for the subject by using one supplied simple subject image; and determining, based on the plurality of generated evaluation images, a piece of teaching data as the optimum teaching data for the subject out of the selected teaching data candidates.

14. The teaching data setting method according to claim 13, wherein the recognition operation conditions include at least a recognition algorithm required for the image processing associated with mounting electronics, the image supplying step supplies a plurality of simple subject images generated based on a recommended lighting intensity as to a lighting condition included in the recognition operation conditions and lighting levels obtained by increasing and decreasing the recommended lighting intensity within a predetermined range, the evaluation image generating step generates the plurality of evaluation images by performing image processing in consideration of possible shot-image variations that will occur in the image processing associated with mounting electronics onto the plurality of said simple subject images supplied in the image supplying step, and the teaching data determining step extracts evaluation images corresponding to the teaching data candidates selected in the teaching data candidate selecting step from the evaluation images generated in the evaluation image generating step, and determines the optimum teaching data for the subject by evaluating the results obtained by carrying out image recognition onto the extracted evaluation images based on the recognition algorithm included in each of the corresponding teaching data candidates.

15. The teaching data setting method according to claim 13, wherein the teaching data required for the image processing associated with mounting electronics is provided to one or more specific machines over a network connecting a service provider side and a service user side, the teaching data generating step, the teaching data candidate selecting step, the evaluation image generating step, the image supplying step, and the teaching data determining step are carried out by the service provider side, and the method further comprises:

a step, to be carried out by the service provider side, of electronically delivering the optimum teaching data determined in the teaching data determining step to the one or more specific machines; and a step, to be carried out by the one or more specific machines included on the service user side, of performing the image processing associated with mounting electronics by using the optimum teaching data delivered by the service provider side.

16. The teaching data setting method according to claim 13, wherein the teaching data required for the image processing associated with mounting electronics is provided to one or more specific machines over a network connecting a service provider side and a service user side, the teaching data generating step, the teaching data candidate selecting step, the evaluation image generating step, the image supplying step, and the teaching data determining step are carried out by the service provider side, and the method further comprises:

a step, to be carried out by the service user side, of obtaining the optimum teaching data determined in the teaching data determining step, and electronically delivering the optimum teaching data to the one or more specific machines; and a step, to be carried out by the one or more specific machines included in the service user side, of performing the image processing associated with mounting electronics by using the optimum teaching data delivered in the electronically delivering step.

17. The teaching data setting method according to claim 13, wherein when the teaching data required for the image processing associated with mounting electronics is provided to one or more specific machines over a network connecting a service provider side and a service user side, the teaching data generating step is carried out by the service provider side, the teaching data candidate selecting step, the evaluation image generating step, the image supplying step, and the teaching data determining step are carried out by the service user side, and the method further comprises:

a step, to be carried out by the service user side, of electronically delivering the optimum teaching data determined in the teaching data determining step to the one or more specific machines; and a step, to be carried out by the one or more specific machines included in the service user side, of performing the image processing associated with mounting electronics by using the optimum teaching data delivered in the electronically delivering step.

* * * * *